United States Patent
Dziadosz et al.

(10) Patent No.: US 6,626,351 B2
(45) Date of Patent: Sep. 30, 2003

(54) METHOD AND APPARATUS FOR THE MANUFACTURING OF STRUCTURAL MEMBERS

(75) Inventors: Lawrence M. Dziadosz, Milford, MI (US); Clarence W. Fulton, Oakville (CA)

(73) Assignee: Tower Automotive Technology Products, Inc., Grand Rapids, MI (US)

( * ) Notice: Subject to any disclaimer, the term of this patent is extended or adjusted under 35 U.S.C. 154(b) by 0 days.

(21) Appl. No.: 09/849,943

(22) Filed: May 4, 2001

(65) Prior Publication Data

US 2002/0033410 A1 Mar. 21, 2002

Related U.S. Application Data

(60) Provisional application No. 60/233,782, filed on Sep. 19, 2000.

(51) Int. Cl.[7] .......................... B23K 31/02; B23K 1/20; B23K 1/19; B23K 20/16
(52) U.S. Cl. .................... 228/235.2; 228/118; 228/157; 228/190; 228/206; 228/262.1; 228/262.51; 228/262.5; 148/535
(58) Field of Search ................................ 228/117, 118, 228/157, 190–194, 206, 262.1, 262.5, 262.51, 235.2; 148/535

(56) References Cited

U.S. PATENT DOCUMENTS

| | | | |
|---|---|---|---|
| 2,366,185 A | 1/1945 | Diehl et al. | |
| 2,383,511 A | 8/1945 | Reynolds | |
| 2,957,230 A | 10/1960 | Johnson | |
| 2,966,728 A | 1/1961 | Balfour | |
| 2,990,608 A | 7/1961 | Manning | |
| 3,003,228 A | 10/1961 | Thomas | |
| 3,167,405 A | 1/1965 | Muije et al. | |
| 3,293,733 A | 12/1966 | Broverman et al. | |
| 3,312,536 A | 4/1967 | Broverman et al. | |
| 3,340,589 A | 9/1967 | Jaeger | |
| 3,342,565 A | 9/1967 | Worthington et al. | |
| 3,436,804 A | 4/1969 | Broverman et al. | |
| 3,465,406 A | 9/1969 | Myers | |
| 3,496,620 A | 2/1970 | Wolfe et al. | |
| 3,650,005 A | 3/1972 | Kamiya et al. | |
| 3,938,363 A | * 2/1976 | Kelsey | 72/364 |
| 4,090,011 A | * 5/1978 | Barkman et al. | 428/653 |
| 4,235,287 A | * 11/1980 | Kleine et al. | 126/671 |
| 4,820,355 A | * 4/1989 | Bampton | 148/535 |
| 5,115,963 A | * 5/1992 | Yasui | 228/157 |
| 5,353,868 A | * 10/1994 | Abbott | 165/147 |

(List continued on next page.)

FOREIGN PATENT DOCUMENTS

| | | | |
|---|---|---|---|
| DE | 2616586 A1 | * | 11/1977 |
| EP | 1178268 A2 | * | 2/2002 |
| JP | 57-70251 A | * | 4/1982 |
| JP | 59-50981 A | * | 3/1984 |

*Primary Examiner*—Tom Dunn
*Assistant Examiner*—L. Edmondson
(74) *Attorney, Agent, or Firm*—Van Dyke, Gardner, Linn & Burkhart, LLP

(57) ABSTRACT

By utilizing a roll bonding process and appropriately forming steps, a load bearing structure is created which is capable of handling and appropriately transferring loads. One preferred method includes the combination of roll bonding and hydroforming to efficiently create structural components. While various product configurations are possible, one version includes a waffle-type structure produced by appropriate roll bonding of material sheets. This waffle-type structure can also undergo additional forming steps to create several structural components capable of handling and carrying loads in a very efficient and effective manner. More significantly, this process enables the use of structural aluminum for load bearing components which are efficiently and cost effective when manufactured.

31 Claims, 11 Drawing Sheets

U.S. PATENT DOCUMENTS

| | | | |
|---|---|---|---|
| 5,392,625 A | * | 2/1995 | Cesaroni et al. ............... 72/421 |
| 5,429,879 A | * | 7/1995 | Syn et al. ................... 228/190 |
| 5,441,675 A | * | 8/1995 | Souders ..................... 264/402 |
| 5,603,449 A | | 2/1997 | Mansbridge et al. |
| 5,624,594 A | * | 4/1997 | Matsen et al. .............. 219/633 |
| 5,669,436 A | * | 9/1997 | Papich et al. ................ 164/461 |
| 6,098,262 A | | 8/2000 | Thoms et al. |
| 6,152,354 A | * | 11/2000 | Childree ..................... 228/206 |
| 6,267,830 B1 | * | 7/2001 | Groll .......................... 148/531 |
| 6,332,644 B1 | * | 12/2001 | Ito et al. ..................... 296/214 |

* cited by examiner

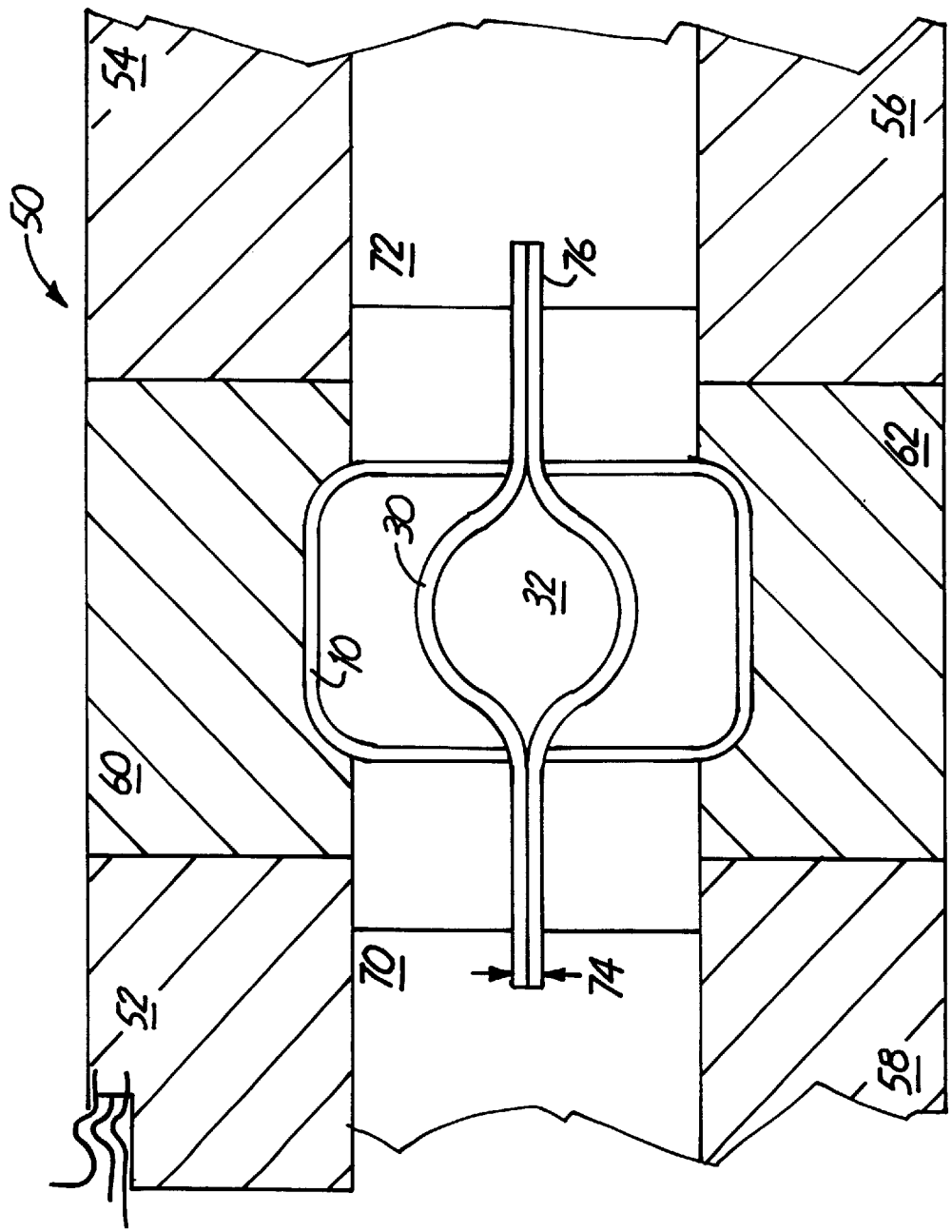

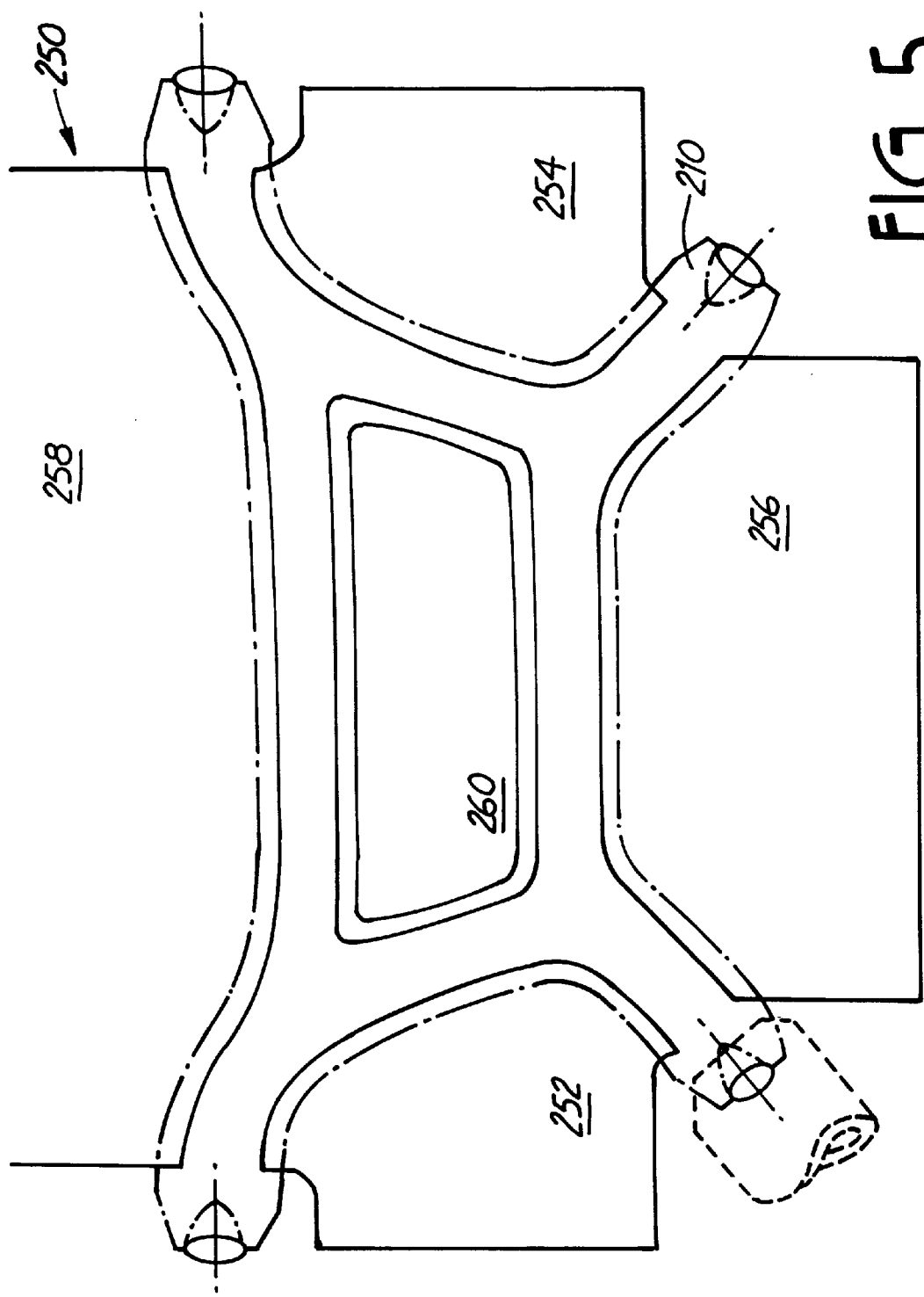

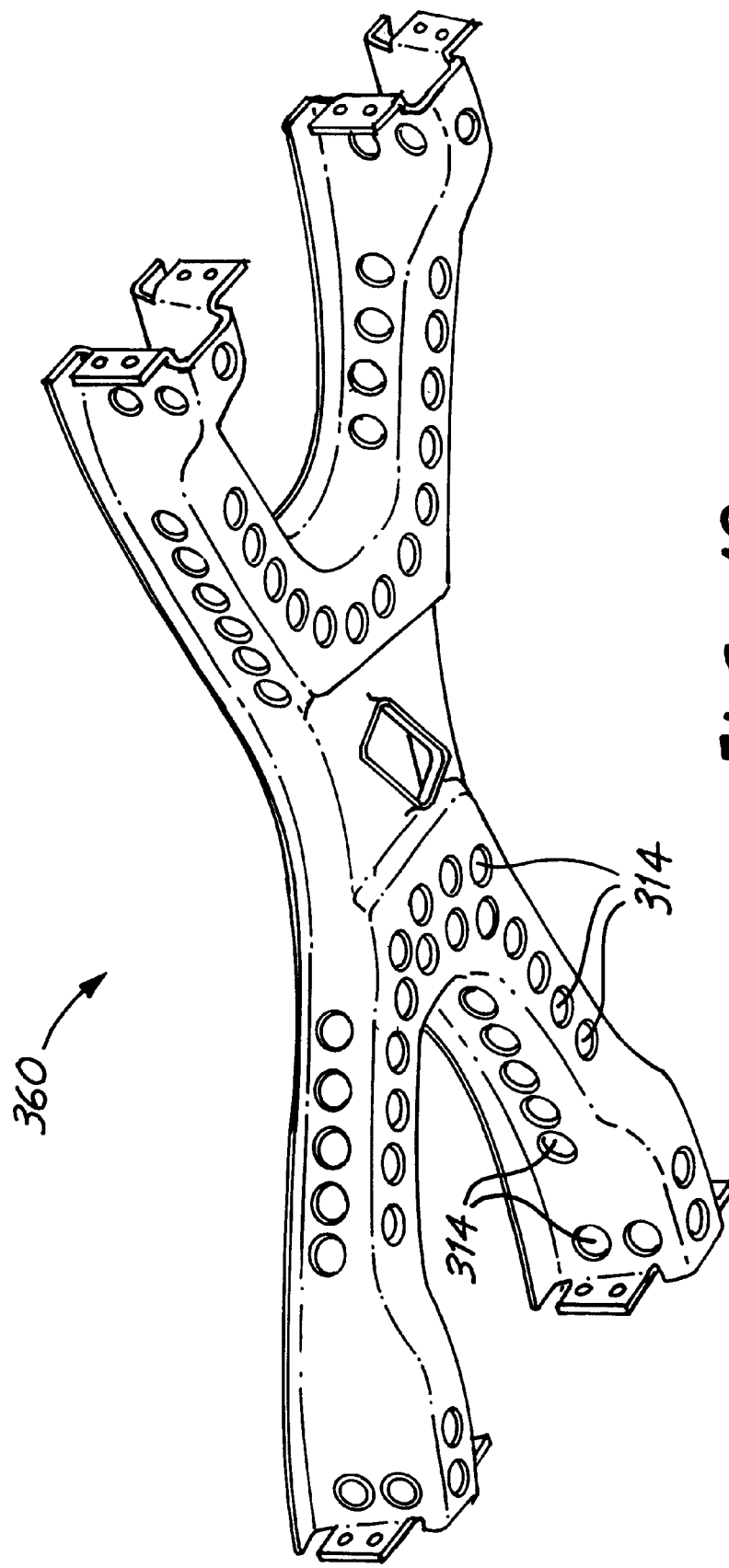

METHOD AND APPARATUS FOR THE MANUFACTURING OF STRUCTURAL MEMBERS

CROSS REFERENCE TO RELATION APPLICATIONS

This application claims priority to the provisional application filed on Sep. 19, 2000, as U.S. Application Ser. No. 60/233,782.

BACKGROUND OF THE INVENTION

The present invention relates to the manufacturing of structural components. More specifically, the present invention relates to the manufacturing of structural components utilized in the automotive industry by exploiting the advantages of roll bonding and/or hydroforming.

As is well known, roll bonding is an efficient method of creating certain metal components. In this process, two sheets of material are introduced to a roll bonding mill whereby they are compressed or sandwiched together to create a molecular bond between the two sheets. By selectively patterning a bond inhibitor (e.g. a graphite, titanium dioxide ($TiO_2$), or like material) the bond can be created in selected areas while avoided in other areas. The two sheets of material can be selectively separated at a later time (as dictated by the bond pattern), to create several structural components. For example, manifolds that require fluid flow in a predetermined pattern or area can easily be fabricated utilizing this process. The process of roll bonding is further outlined in U.S. Pat. Nos. 3,340,589 and 2,957,230.

As appreciated by those familiar with this technology, roll bonding is best suited for relatively thin sheets of material. Using these thinner sheets allows for the easy handling by the rolling mill because only limited separation between work rolls is required. Consequently, roll bonding has traditionally been best suited for non-structural components such as manifolds, etc.

In automotive applications, there are needs for all types of manufactured components. One such category is structural components such as frames, load bearing members, bracketry, etc. Naturally, many of these have a fairly significant weight handling and strength requirements. Consequently, when trying to implement these structural components in aluminum, structural aluminum is typically best suited. This structural aluminum includes 5,000 and 6,000 series aluminum alloys which typically contain some portion of magnesium. 3,000 series alloys may also be used.

Due to the magnesium contained in typical structural aluminum, it traditionally has not been easily roll bonded. When heated prior to introduction into the roll bonding press, an oxide is often created on the surface. This oxide prohibits the aluminum from easily being bonded. The weight handling requirements, combined with the complications of roll bonding structural aluminum, have typically suggested that roll bonded structures could not be easily used for these automotive applications.

In addition to the weight handling capabilities that are required for automotive component applications, actual weight is a continuing consideration. Naturally, automakers are constantly looking for ways to reduce weight, thus increasing fuel economy, etc. This naturally suggests that aluminum would be an appropriate material for use in automotive components due to its weight characteristics. However, aluminum has inherent strength constraints. Consequently, steel has traditionally been used to achieve the required strength and other methods have been attempted to reduce weight.

As mentioned above, certain structural aluminum alloys certainly do display strength characteristics which would allow their use as structural components. Two primary complications exist with the use of aluminum components, however: (1) the aforementioned complications in roll bonding high strength aluminum alloys, and (2) additional raw material required to achieve the necessary strengths. To obtain these necessary strengths, heavier gauges of material is often required. This inherently requires the use of more raw materials—a raw material which is more expensive than steel to start with. Consequently, other methods (beyond simply using heavier gauge materials) are necessary in order to achieve the desired strength while staying within cost constraints.

Roll bonding itself provides further advantages by allowing the formation of complex structures due to the ability to create intricate patterns of bond inhibitor. More specifically, curves and/or bends can easily be created by appropriate patterning of the bond inhibiting material pattern. Similarly, diameter variations can also be easily accomplished.

In light of the above advantages, it would be beneficial to utilize the processes of roll bonding to create structural members.

A technology which is becoming widely used in the fabrication of structural components is hydroforming. As is well known, hydroforming involves the placement of a preformed blank within the hydroforming die and injecting a fluid into a closed interior cavity of the blank. The fluid is pressurized to a predetermined level, which causes the blank to expand until meeting the interior wall surface of the die. Hydroforming is a very advantageous process in that various configurations can be easily achieved. Most hydroforming processes utilize a traditional blank which is configured as a typical tube of some type. This tube may be a blank pipe, or make take on other shapes. In order to accomplish forming, the blank must include an enclosed cavity to accommodate fluid injection.

Traditionally, hydroforming of complex structures is not possible due to various limitations in tube forming and product expansion. As it is well known, products cannot be expanded beyond certain limits. Further, hydroforming of flat blanks (or blank structures which are substantially flat when placed in the hydroforming die) is very complex and traditionally impractical. As previously mentioned, the base material cannot realistically be expanded beyond a certain level. Consequently, the aforementioned tubes have been used as a convenient starting point because only limited expansion has been required.

As can be appreciated, roll bonding further provides advantages in the formation of complex structures due to the ability to create very intricate patterns. More specifically, curves and/or bends can easily be created by appropriate forming of the bond inhibiting material pattern. Similarly, diameter variations can also be easily accomplished.

In light of the above advantages, it would also be beneficial to combine the processes of roll bonding and hydroforming to create structural members.

SUMMARY OF THE INVENTION

In order to capitalize on all the manufacturing efficiencies typically involved with roll bonding and hydroforming, the present invention incorporates various aspects of both processes to create structural components. While both hydroforming and roll bonding is described below, clearly various aspects of either process alone could advantageously be utilized to create structural components.

To begin the process, roll bonding of structural aluminum is done utilizing a modified process. As previously mentioned, roll bonding of structural aluminum has traditionally not been practical due to the formation of oxides on the surfaces of these aluminum alloys. In order to avoid the creation of oxides, the structural aluminum component is manufactured by a lower temperature, quick preheating step which eliminates the creation of oxides on the surfaces while performing the necessary material preparation. As an additional measure, the preheating chamber could easily be treated with nitrogen as further step in avoiding oxide formation. In order to create the required configuration of parts, the bond inhibitor, or "stop weld" can be appropriately patterned on the raw material. This is then sent through the roll bonding mill. The roll bonded stock is then stamped in predetermined patterns which correspond to the roll bonding pattern, to create flat stock blanks.

These flat stock blanks are then hydroformed into structural members. A unique hydroforming process is used which includes some preforming, in order to accommodate insertion into the hydroformed structure. Also, a hydroform tool is required for controlling the expansion of the aluminum during the hydroformed process.

The hydroform process itself, starting with flat stock, has not been done in the past due to the expansion characteristics required. Specifically, hydroforming has not been done with roll bonded sheets specifically configured to create the desired tubes. Because the process is being started with flat stock (rather than a tube), the hydroform fixture must more closely control the way the metal expands.

In order to accomplish this hydroforming, a very unique hydroforming fixture is created which has multi-component die which is specifically configured to accommodate the part being fabricated. Most importantly, the die has various clamps and moveable components which will initially receive and hold the flat stock blank. During the actual hydroforming process thereafter, this fixture will then adjust or move as necessary with the expanding blank. Consequently, over stressing of the aluminum material is avoided during the process.

To provide structural weight bearing capabilities, one embodiment of the finished components utilizes a unique waffle-type pattern which is created via roll bonding. This waffle pattern has a plurality of bond points located throughout its structure. The appropriate placement of a bond inhibitor during the roll bonding process, allows this waffle-type structure to be created. After the roll bonding step is completed, the two sheets of aluminum alloy are separated (at those points where no bond exists), thus creating the three dimensional waffle-type structure as desired.

Due to the three-dimensional structure created, the waffle material allows for greater weight bearing capabilities. More specifically, loads are distributed throughout the structure of the material so that concentrated stress points are avoided.

In order to create these load-bearing structures, two sheets of aluminum alloy material are first chosen of appropriate dimension and thickness. Next, a bond inhibiting material is patterned on one surface of one sheet. The two sheets are then positioned with their major surfaces adjacent one another (and the bond inhibiting pattern therebetween), and are introduced to a roll bonding mill. As well-known, these roll bonding mills have at least two work rolls that are separated by a predetermined distance, and are controlled to provide appropriate pressures to the material sheets introduced therebetween. This creates the desired bond between the material sheets at the desired locations.

Next, an appropriate process is used to separate the sheet material at the unbonded locations. This process may include the use of pressurized air or fluid which is injected between the sheets at the unbonded locations. Further, a forming die may be used to closely control the expansion. This forming process may be very similar to the above discussed process of hydroforming. At this point, the three dimensional waffle-type structure is created which can then be subjected to further operations. For example, additional cutting may be required to achieve a desired configuration. Similarly, bending or other forming operations may be utilized to further form the component into its desired configuration.

Again to allow the efficient use of the roll bonding process in creating this waffled structure, additional steps are necessary to achieve roll bonding of structural grade aluminum. As mentioned above, roll bonding may be accomplished in an enclosed chamber which has a very controlled environment. More specifically, a nitrogen gas, or other appropriate gas may be injected into the chamber and all oxygen removed. This provision would avoid the creation of oxide on the surface of the aluminum sheets. Alternatively, a low temperature, quick preheating step may be used.

It is an object of the present invention to create structural components utilizing the efficient and economical process of roll bonding. Using this process, structural load bearing capabilities are created through the creation of a unique three dimensional structure which evenly distributes and carries the necessary loads.

It is a further object of the present invention to provide load bearing structures, which utilize structural grade aluminum alloys.

It is another object of the present invention to cost effectively create components by using appropriate gauged aluminum materials. This effectively reduces the amount of raw materials used in the processing of structural components, thus also reducing one major cost element.

BRIEF DESCRIPTION OF THE DRAWINGS

Further objects and advantages of the invention can be seen by reviewing the following detailed description and the drawings in which:

FIG. 3 is a cross sectional diagram of the hydroforming fixture illustrating the moveable die components;

FIG. 5 is a top view of an alternative blank and a hydroforming fixture utilizing the process of the present invention;

FIG. 12 is a perspective view of an alternative finished component which also displays the waffle-type structure.

DETAILED DESCRIPTION OF PREFERRED EMBODIMENTS

The present invention provides many methods and devices for the manufacturing of aluminum components. In the preferred embodiments, each of these components begin by roll bonding to create a roll bonded blank. Following the initial roll bonding process, the roll bonded blanks are then further formed using various additional manufacturing steps.

Significantly, in their most preferred form, these roll bonded blanks are fabricated from structural aluminum, which has historically not been easily roll bonded.

Figure 1:
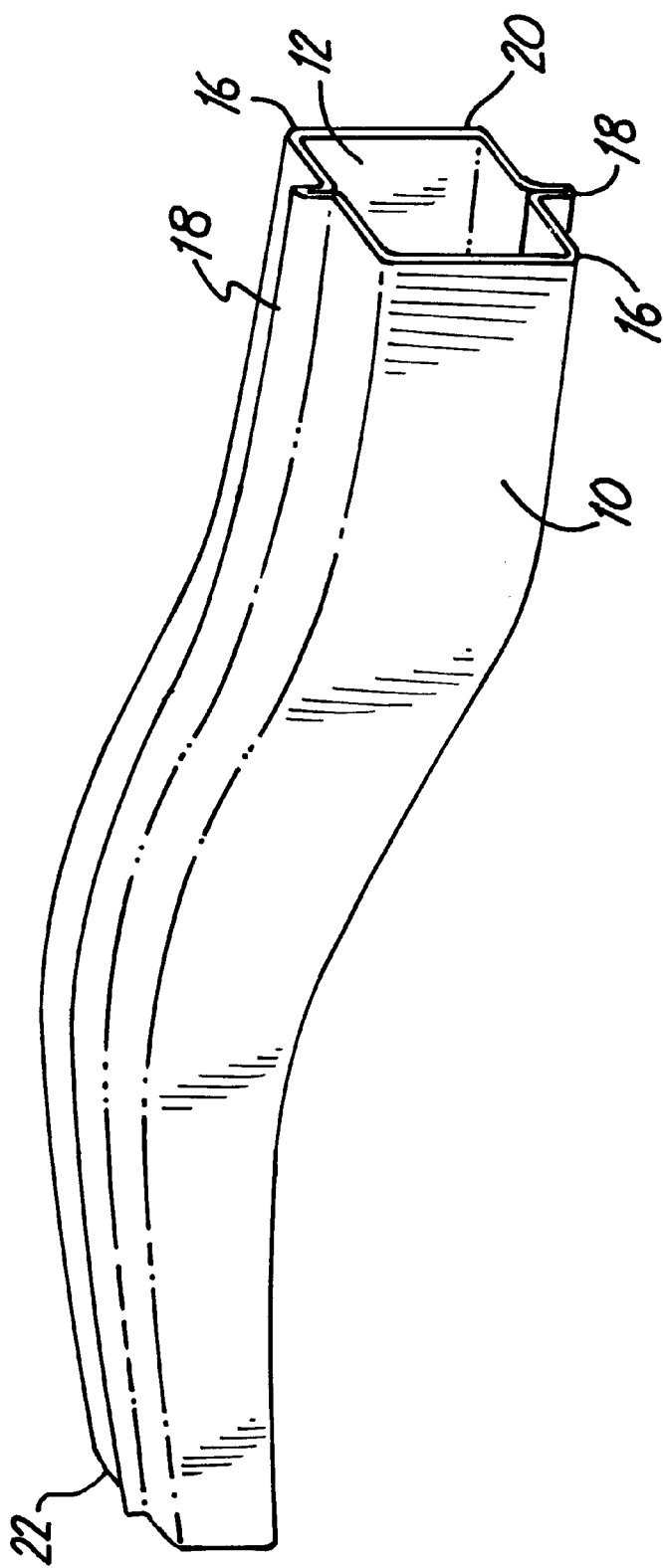
FIG. 1 is a perspective view of one finished structural component fabricated utilizing the process of the present invention.

In one form, the processes of roll bonding and hydroforming are combined to efficiently create a manufactured component. Referring to FIG. 1, there shown a structural component 10 manufactured utilizing the combined roll bonding and hydroforming processes. As can be seen, this component is substantially tubular in nature having and enclosed portion 12 surrounded by a first side wall 14 and a second side wall 16. A pair of flanges 18 extend from a first end 20 to a second end 22.

In order to roll bond structural aluminum, it is necessary to control the formation of oxides. Thus, the actual roll bonding process includes quick preheating to a relatively low temperature immediately prior to roll bonding. Thus oxides are avoided. As a further measure, nitrogen may be introduced into the preheating chamber.

Figure 2:
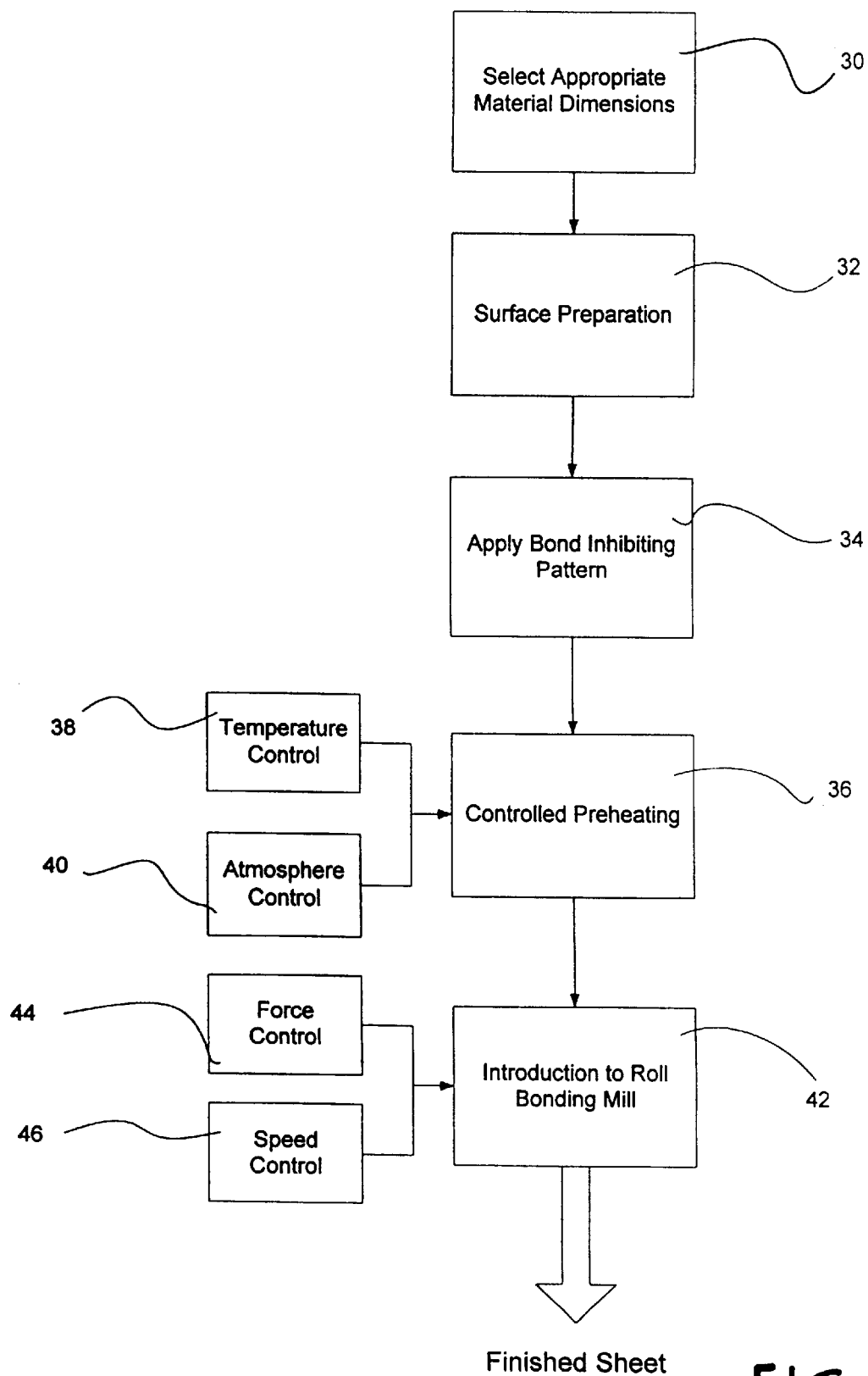
FIG. 2 is a flow chart illustrating the basic steps involved in roll bonding of structural aluminum sheets.

Referring now to FIG. 2, there shown a basic flow chart outlining the steps involved with roll bonding of structural aluminum components. As anticipated, the process begins by selecting the appropriate materials in step 30. This obviously requires appropriate width and length dimensions, but more importantly includes the appropriate selection of the correct material thickness.

Next, all surface preparation steps are provided in step 32. This includes appropriate cleaning and surface preparation of the surfaces to be roll bonded. Next, in step 34, a bond inhibiting pattern is applied to appropriately control the bonding locations. This step often involves the screen printing of graphite pattern onto one surface of the roll bonding materials.

Next, in step 36, the two sheets which will be roll bonded are appropriately preheated. As previously mentioned, in order to allow the appropriate roll bonding of structural grade aluminums, it is necessary to avoid oxide formation. One way to avoid this oxide formation is by using a lower temperature, short time period preheating step. Obviously, this requires the related step of temperature control 38. Alternatively, atmospheric control 40 can be used to similarly avoid oxide formations. For example, the preheating chamber may include a nitrogen gas to discourage the formation of oxides.

Next, the two aluminum sheets are presented to the roll bonding mill in step 42. As appreciated, this involves the application of force to compress the sheets, thus forming appropriate bonds at the desired locations. Obviously, force control 44 is required along with speed control 46. Following the pass through the roll bonding mill, a finished roll bonded sheet is then produced which can be presented to later forming steps.

Referring now to FIG. 3, there shown a partial cross sectional diagram of the hydroforming device 50 utilized to form the structural component 10. Hydroforming device 50 includes four fixed support portions 52, 54, 56 and 58 each of which are held in a substantially fixed position. An upper die 60 and a lower die 62 are also held in a relatively fixed position and are held in place by fixed support portions, 52, 54, 56 and 58. Additionally, hydroforming device 50 includes a first slide member 70 and second slide member 72. First slide member 70 includes a clamping portion 74 for holding flange 18 during the forming process. Similarly, second slide member 72 also includes a clamping portion 76 for holding the flange 18.

As seen in FIG. 3, a blank 30 is initially inserted into hydroforming device 50 such that the flanges 18 are held in first clamp 74 and second clamp 76. Next, the typical hydroforming operation is undertaken whereby fluid is injected into the interior 32 of blank 30. This fluid is then pressurized causing blank 30 to expand. During this expansion, first slide 70 and second slide 72 are moved inwardly, thus allowing the blank to expand in a controlled manner. Ultimately, first slide 70 and second slide 72 are moved to their final position thus allowing structural component 10 to be expanded to meet upper die 60 and lower die 62. This results in the structural component 10 manufactured utilizing the hydroform process.

It should be noted that blank 30 as shown in FIG. 3 has been partially opened to create interior 32. While this preforming accommodates the hydroforming step, this separation or opening of the blank could also be done during the actual hydroforming step.

As can be imagined, several complex configurations for upper die 60 and lower die 62 can be obtained. These configurations can include various curves and bends which are not otherwise obtainable in traditional hydroforming. Through the use of a hydroforming device which includes moveable components, the hydroforming process can be easily controlled thus allowing controlled expansion of the blank.

The blank 30 shown in FIG. 3 can easily be fabricated using a traditional roll bonding process. As expected, a bond inhibiting material can be placed on the meeting surfaces of the two roll bonded sheets thus avoiding a bond at the center portion while creating a secure bond at the flanges. Subsequently, through appropriate hydroforming operations the two sheets can be separated and expanded thus creating the structural component desired.

Figure 4A:
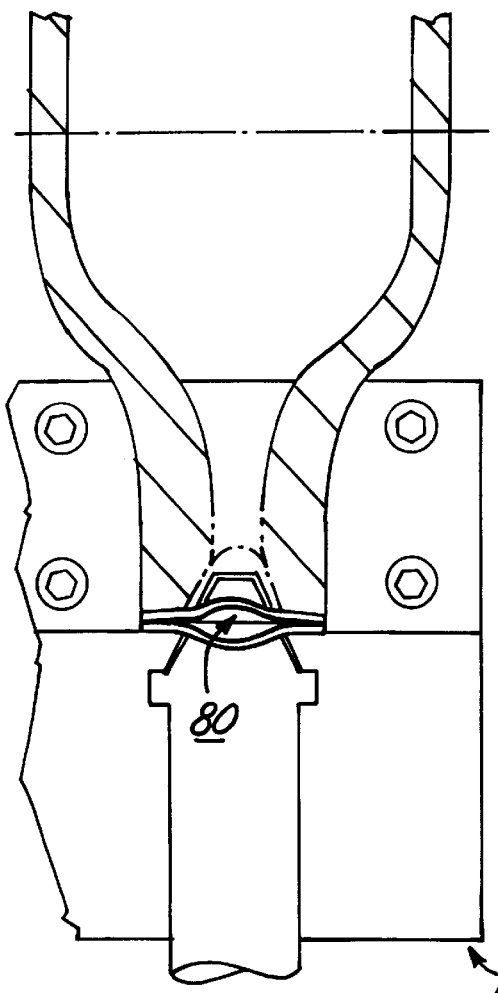
FIGS. 4A and 4B are two cross sectional views of the hydroforming fixture utilized to implement the present invention.
Figure 4B:
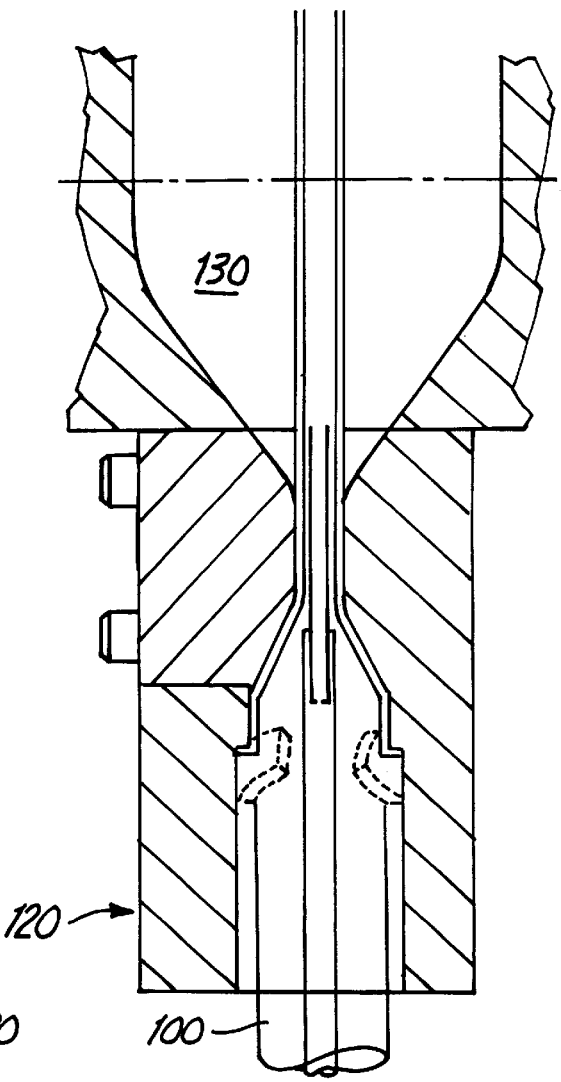

Referring to FIGS. 4A and 4B there is shown a top cross sectional drawing (FIG. 4A) and side sectional partial cross sectional drawing (FIG. 4B) illustrating a portion of the hydroforming operation. As anticipated, these portions accommodate the insertion of an intensifier 100 into a mounting block 120. It is anticipated that a quick lock device is utilized which can easily be inserted and removed from the block 120. Such a device utilizes a ¼ turn to lock in place and a ¼ turn to subsequently release. As seen in FIG. 4A, the intensifier 100 can be inserted into an opening 80 in the end portion of the roll bonded blank. Subsequently, the hydroforming process is undertaken allowing the expansion of the blank to meet the walls of die cavity 130.

Referring FIG. 5 there is shown a schematic diagram illustrating the application of the present invention to an alternative part. In this configuration, a complex blank 210 is shown as inserted into a hydroforming device 250. Hydroforming device 250 includes multiple slide members including first slide 252, second slide 254, third slide 256 and fourth slide 258. In hydroforming operations, each of these slides will move towards a central clamping structure 260, thus appropriately controlling expansion of blank 210.

Figure 6:
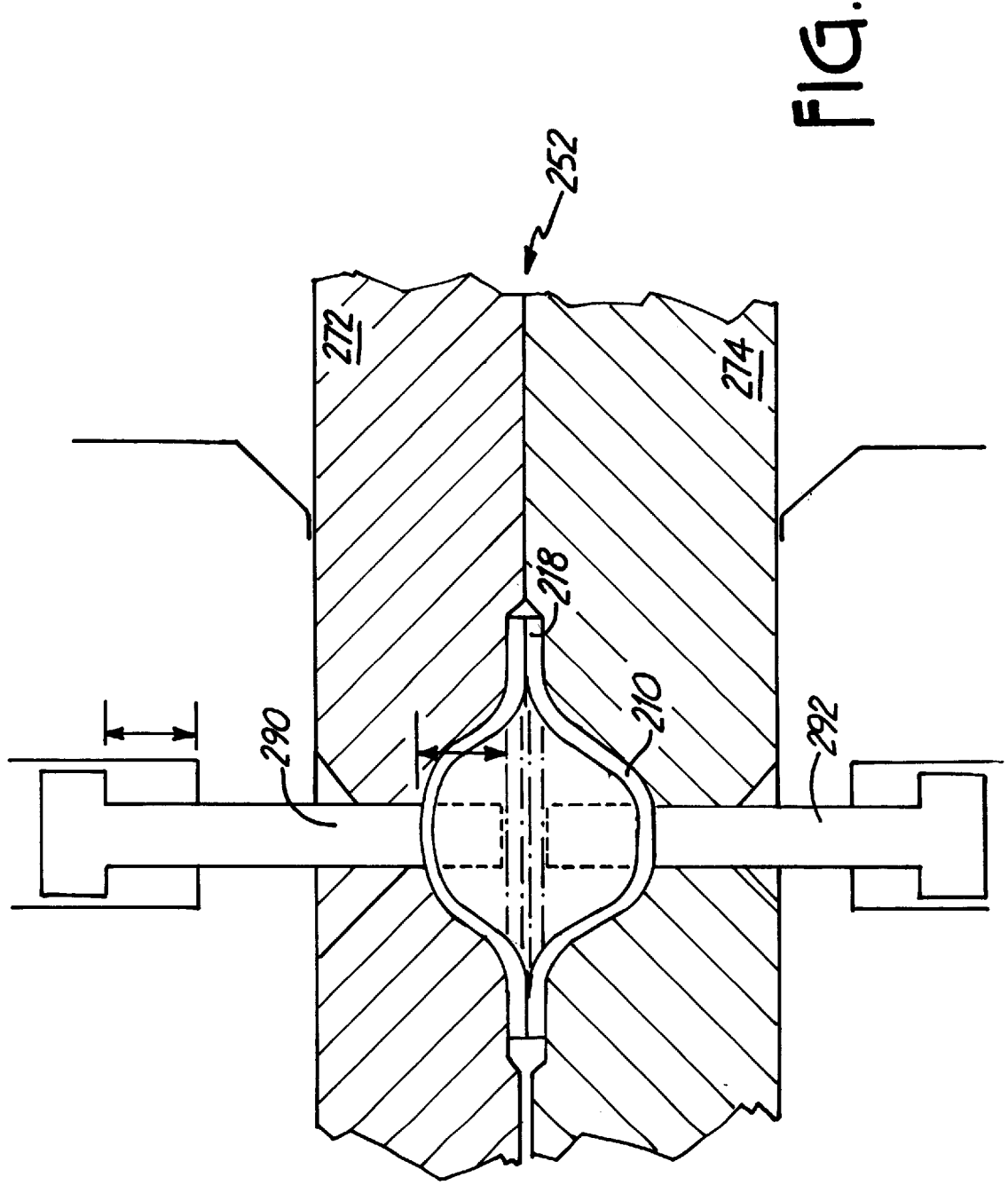
FIG. 6 is a partial cross sectional of the hydroforming structure shown in FIG. 4.

FIG. 6 illustrates a partial cross sectional drawing of hydroforming device 250 which will accommodate the hydroforming of blank 210 as shown in FIG. 5. As expected, slide 252 includes an upper slide member 272 and a lower slide member 274 which again clamp on to a flange 218 of blank 210. During hydroforming, first slide 252 will move inwardly (towards the left in FIG. 6) while the component is pressurized. This results in controlled expansion of the die. In FIG. 6, and upper control pad 290 and a lower control pad 292 are further utilized to appropriate control expansion within hydroforming device 250.

Figure 7:
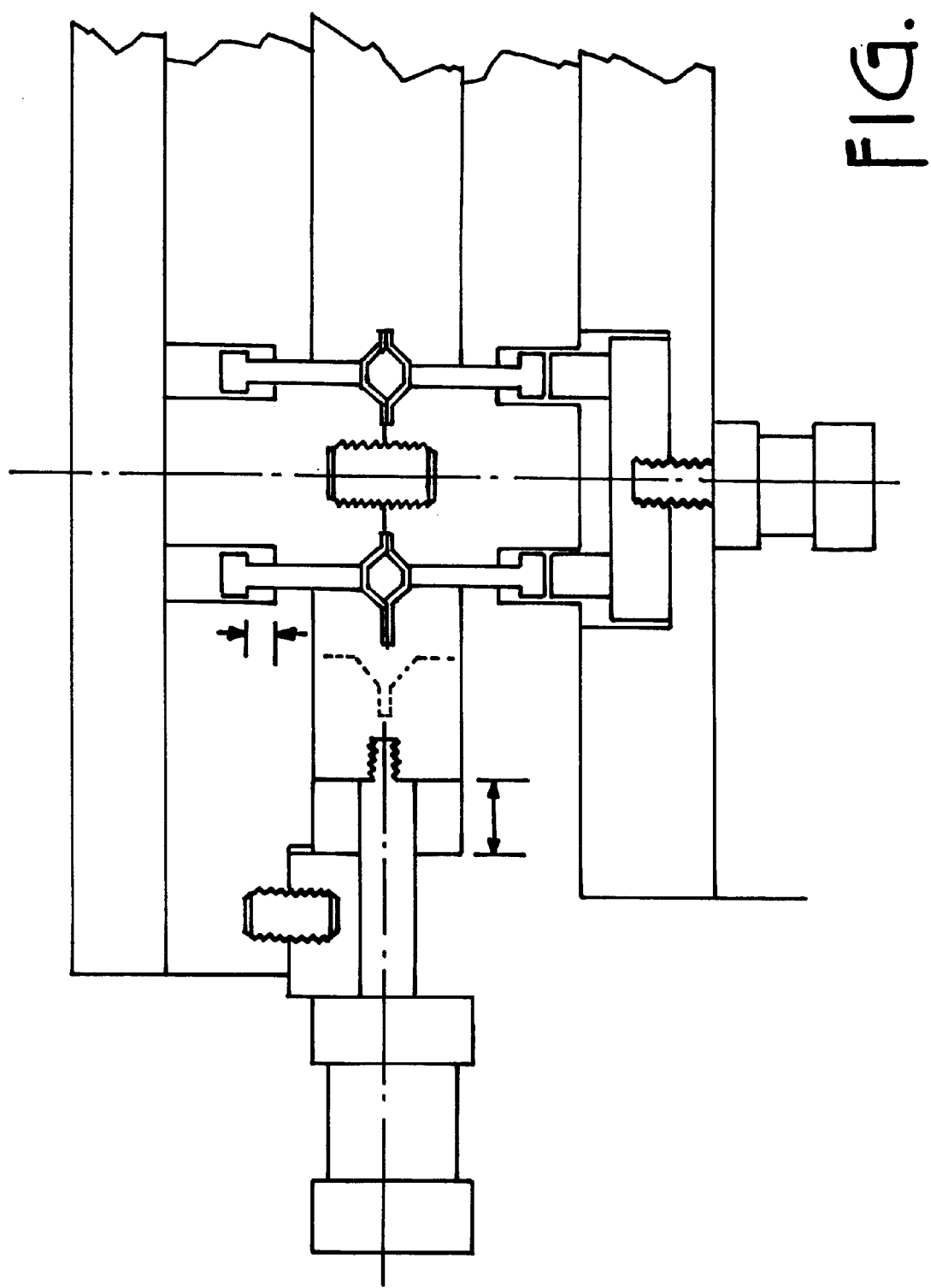
FIG. 7 is a more complete view of the hydroforming structure utilizing the process of the present invention.

FIG. 7 shows a more comprehensive drawing of hydroforming device 250, including multiple components and slides to accommodate the complex configuration blank 210.

While it has been mentioned above that the various blank can easily be fabricated utilizing a roll bonding process, it is further appreciated that other manufacturing methods could easily be used. For example, the blank could easily be fabricated using a welded or appropriate epoxy attachment can be used. Also, the final forming steps could easily use processes other than hydroforming. Other obvious modifications are clearly possible.

Once again, the present invention provides sufficient structural stability to allow the use of aluminum components in weight bearing applications. One way to accomplish this is by creating a unique waffle-type structure, which is capable of appropriately distributing and handling loads encountered. The waffle-type structure is preferably created using the above discussed roll bonding process, resulting in a three-dimensional structure, which is bonded at certain points while having multiple walls at other points. By providing appropriate separation at the unbonded locations, the desired load handling structure can be created. As outlined below in further detail, this structure provides appropriate load transfer and handling characteristics, thus avoiding stress points. Further, the resulting structure is lightweight and cost effective.

Figure 8:
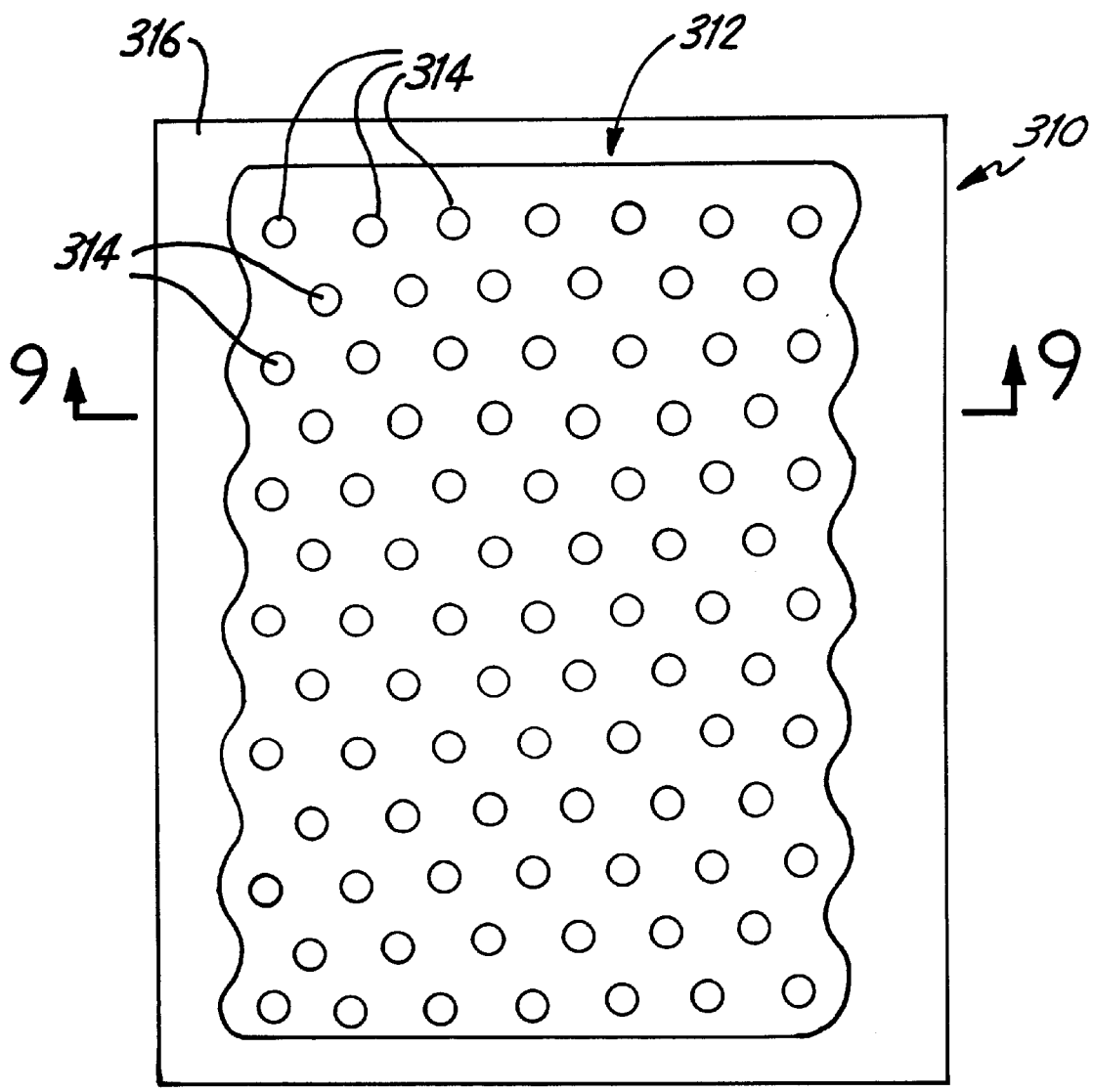
FIG. 8 is a top view of one embodiment of the present invention wherein the desired structure is a formed waffle-type material.
Figure 9:
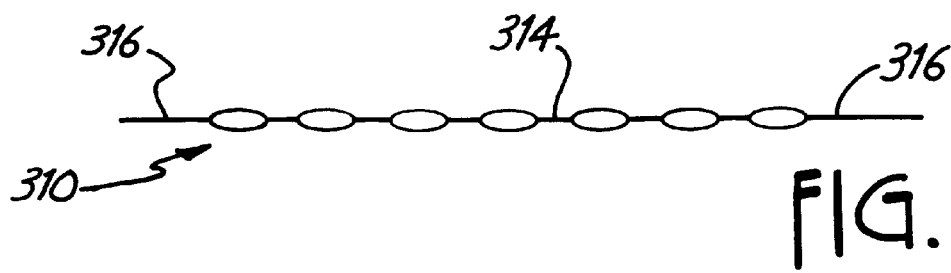
FIG. 9 is a cross-sectional drawing of the waffle-type material shown in FIG. 7, along section lines A—A.
Figure 10:
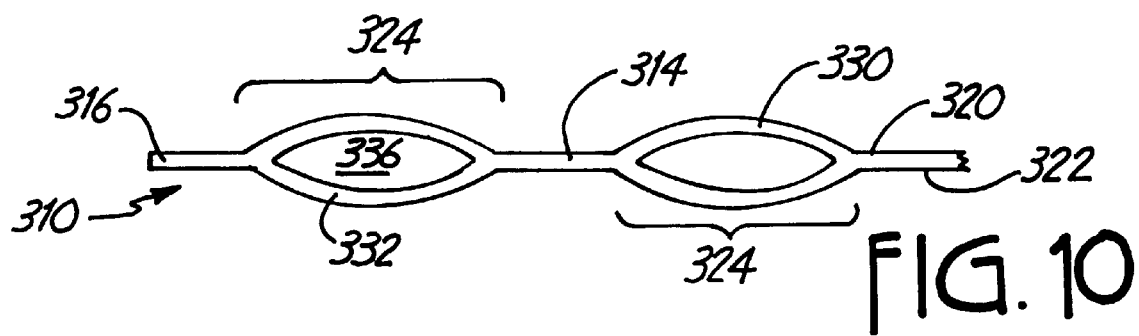
FIG. 10 is a close-up cross-sectional view showing the structural configuration of the waffle-type material.

Referring now to FIG. 8, there is shown a top view of one exemplary roll bonded structure in accordance with the present invention. FIG. 9 illustrates a cross-sectional view of this structure, taken along section line A—A of FIG. 8. Similarly, FIG. 10 illustrates a more close-up partial cross-sectional view of the same structure. In FIG. 10, it is easier to see the actual internal structure of the load bearing sheets.

Referring to FIG. 8, the load bearing structure 310 is shown as a substantially rectangular member having a bond pattern 312 located in a central portion thereof. This bond pattern is created using roll bonding techniques, which are generally well-known to those skilled in the art. In summary, roll bonding involves the use of high pressures exerted between two sheets of material to create a bond at certain points therebetween. This bond can be inhibited by utilizing a bond inhibiting compound at desired locations. By appropriately patterning this bond inhibiting compound, several patterns can be easily created.

Referring again to FIG. 8, bond pattern 312 is configured in a substantially grid-like manner. More specifically, a plurality of bond points are appropriately positioned throughout a central portion of structure 310. A peripheral bond 316 is also created around the edges of structure 310. As better illustrated in FIGS. 9 and 10, these bond points are made up of substantially solid structure which extends from a first surface 320 to a second surface 322. At those points where bonds do not exist, an unbonded region 324 is created. In unbonded region 324, the first material sheet 330 and the second material sheet 332 are separated from one another, creating an air gap 336.

Figure 11:
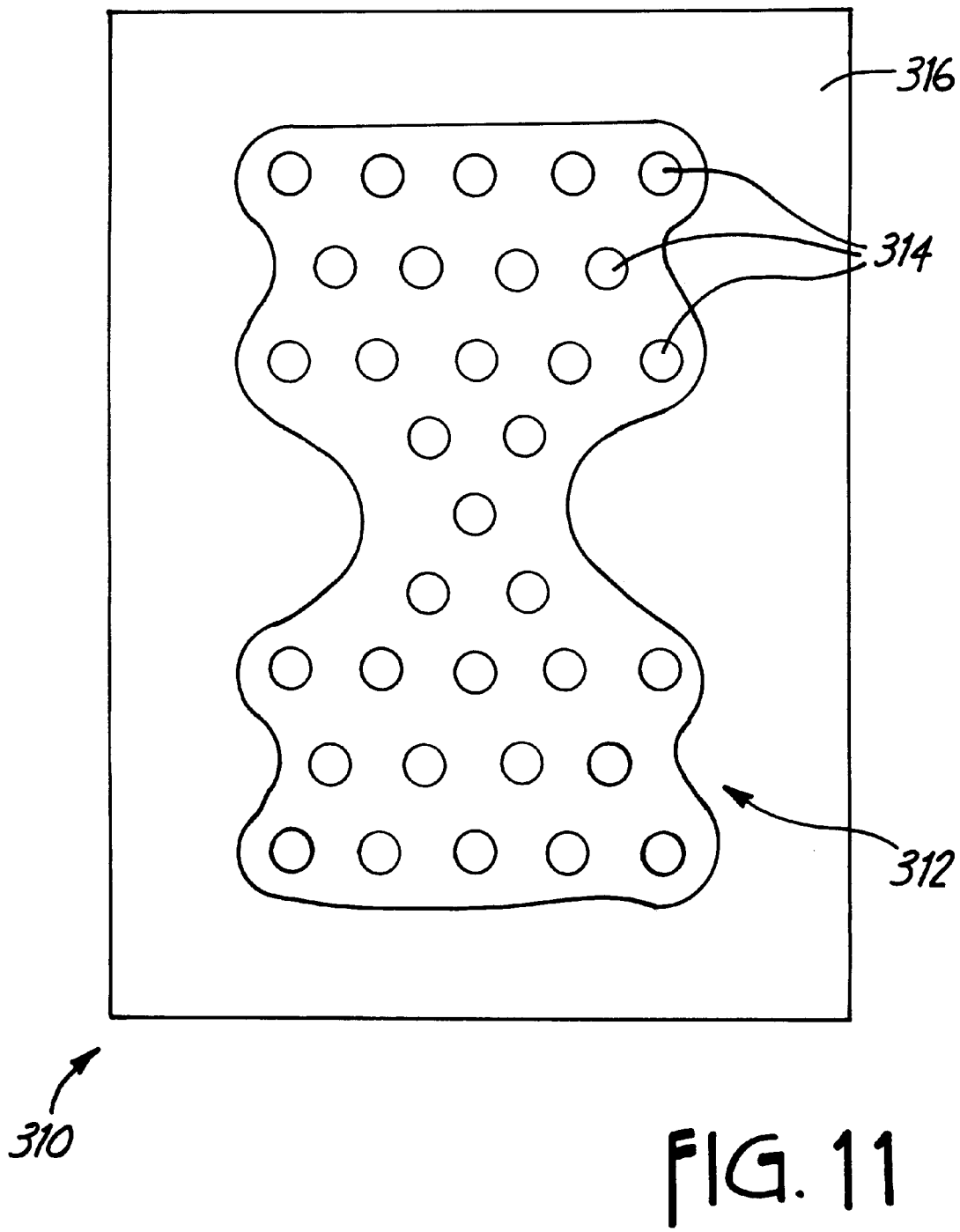
FIG. 11 is an alternative waffle-type structure.

Obviously, the bond pattern can be adapted to several unique configurations, to meet the specific needs of the product involved. Additionally, the amount of separation, or size of air gap 336 can also be varied as necessary. As one illustration, an alternative bond pattern is shown in FIG. 11 having a somewhat hour-glass type shape thereto. This further illustrates how the bond pattern can be altered to best fit the component being considered.

As will be clearly recognized by those skilled in the art, the waffle patterns, and appropriate separation of material between bond points, allows for the easy distribution of loads throughout the material. Because a three-dimensional structure is created, transverse loads and stresses can be managed in a predictable and efficient manner, thus creating a substantially rigid load bearing structure.

Referring now to FIG. 12, there is shown one alternative embodiment of the present invention wherein the waffle-type structure has been further processed to create a cross-member 360. As can be seen, cross-member 360 includes a plurality of bond points 314, spaced at several unique positions throughout. Obviously, cross-member 360 has undergone further processing steps following the bonding process. Specifically, cutting was required to create an appropriate blank, which is then shaped using various methods. For example, die pressing could be used to shape the desired three-dimensional structure. Alternatively, die pressing could be used in conjunction with hydroforming to again create the desired structure.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method of making structural aluminum components, comprising:

preparing a mating surface of a first aluminum sheet and a mating surface of a second aluminum sheet, the first and second aluminum sheets comprising a structural grade aluminum;

preheating the first and second sheets in a controlled environment to substantially limit formation of oxidation on the mating surfaces of the first and second sheets;

roll bonding the first aluminum sheet and the second aluminum sheet substantially immediately following preheating the sheets to substantially limit formation of oxidation on the mating surfaces of the first and second sheets, the first and second aluminum sheets being roll bonded in a predetermined pattern so that the first aluminum sheet and the second aluminum sheet are bonded at predetermined bond locations, and are not bonded at other non-bonded locations;

separating the non-bonded portions of the first aluminum sheet and the second aluminum sheet to create a gap between the first aluminum sheet and the second aluminum sheet, thus creating a waffle type structure; and forming the component into a final configuration.

2. The method of claim 1 wherein the bonds are generally aligned in at least two directions to generally define a grid pattern.

3. The method of claim 1 wherein the predetermined locations are each substantially circular in shape and are configured in a linear pattern.

4. The method of claim 1 wherein prior to separating the non-bonded portions, the method includes placing the roll bonded sheets in a die and controlling the separation of the non-bonded portions by moving at least one movable die component while the non-bonded portions are separated, the at least one movable die component initially securing to a portion of the roll bonded sheets.

5. The method of claim 1 wherein the structural grade aluminum comprises a 6000 series aluminum alloy.

6. A method for forming structural components from raw sheet material, comprising:

preparing the mating surfaces of two pieces of sheet material, said two pieces of sheet material comprising structural grade aluminum;

applying a predetermined pattern of bond inhibiting material to at least one of the mating surfaces;

preheating the two pieces of sheet material at a low temperature to achieve a roll bondable condition while avoiding the formation of oxides or contaminants on the mating surfaces, said preheating process being performed while the two pieces of sheet material are in a preheating chamber having a controlled environment to limit formation of oxides on the mating surfaces;

roll bonding the two preheated pieces of sheet material to create a roll bonded sheet, wherein the roll bonded sheet is substantially unitary at those locations where no bond inhibiting material was placed and has a double wall structure where the bond inhibiting material was placed; and forming the roll bonded sheet into a finished component.

7. The method of claim 6 wherein the step of separating involves hydroforming.

8. The method of claim 6 wherein the step of forming involves stamping and die cutting.

9. The method of claim 6 wherein the step of preheating comprises a rapid preheating of the two pieces of sheet material.

10. The method of claim 6 wherein the controlled environment includes a substantially oxygen free environment to discourage the formation of oxides.

11. The method of claim 6 wherein the step of preheating includes treating the preheating chamber with nitrogen.

12. The method of claim 6 wherein the structural grade aluminum comprises a 6000 series aluminum alloy.

13. A method for creating a roll bonded blank for use in further manufacturing components, comprising:

preparing the mating surfaces of a first material and a second material, said first and second materials comprising structural grade aluminum;

applying a predetermined pattern of bond inhibiting material to at least one of the mating surfaces;

preheating the first material sheet and the second material sheet at a low temperature to achieve a roll bondable condition while substantially avoiding the formation of oxidation or contaminants on the mating surfaces by quickly preheating at the low temperature and controlling the environment surrounding the sheet pieces while they are preheated; and roll bonding the two pieces of sheet material to create at least one roll bonded blank, wherein the at least one roll bonded blank is substantially unitary at those locations where no bond inhibiting material was placed and has a double wall structure where the bond inhibiting material was placed, the step of roll bonding the two pieces of sheet metal being performed substantially immediately following the step of preheating in order to substantially limit oxidation on the mating surfaces.

14. The method of claim 13 further comprising the step of forming the roll bonded blank into a finished component.

15. The method of claim 14 wherein the step of forming involves hydroforming.

16. The method of claim 15 wherein the step of forming involves stamping and die cutting.

17. The method of claim 14 wherein the step of forming comprises forming the roll bonded blank into a cross member for a vehicle.

18. The method of claim 13 wherein the controlled environment comprises a substantially oxygen free environment to discourage the formation of oxides.

19. The method of claim 13 including:

placing the roll bonded blank in a die having at least one movable die component which initially secures a portion of the bonded sheets;

separating the double wall structure to create a gap between first aluminum sheet and the second aluminum sheet; and controlling the separation of the double wall structure by moving the at least one movable component while the double wall structure is separated.

20. The method of claim 13 wherein the structural grade aluminum comprises a 6000 series aluminum alloy.

21. The method of claim 1, wherein forming the component comprises forming the component into a cross member for a vehicle.

22. A method of making structural plate components, comprising:

preparing a mating surface of a first aluminum sheet and a mating surface of a second aluminum sheet, the first and second aluminum sheets comprising a structural grade aluminum;

preheating the first and second sheets;

roll bonding the first aluminum sheet and the second aluminum sheet substantially immediately following preheating the sheets to substantially limit formation of oxidation on the mating surfaces of the first and second sheets, the first and second aluminum sheets being roll bonded in a predetermined pattern so that the first aluminum sheet and the second aluminum sheet are bonded at predetermined bond locations, and are not bonded at other non-bonded locations;

separating the non-bonded portions of the first aluminum sheet and the second aluminum sheet to create a gap between the first aluminum sheet and the second aluminum sheet, thus creating a waffle type structure, wherein prior to separating the non-bonded portions, the method includes placing the roll bonded sheets in a die and controlling the separation of the non-bonded portions by moving at least one movable die component while the non-bonded portions are separated, the at least one movable die component initially securing to a portion of the roll bonded sheets, wherein controlling separation includes moving the at least one movable component in a direction generally parallel to the bonded sheets while the non-bonded portions are separated; and forming the component into a final configuration.

23. The method of claim 22 including controlling expansion of the non-bonded areas by moving at least one control pad at a non-bonded portion in a direction generally transverse to the bonded sheets.

24. The method of claim 6, wherein forming the rail bonded sheet comprises forming the roll bonded sheet into a cross member of a vehicle.

25. The method of claim 6 including:
placing the bonded sheets in a die, the die having at least one movable component which initially secures a portion of the bonded sheets;
separating the non-bonded portions of the first aluminum sheet and the second aluminum sheet to create a gap between the first aluminum sheer and the second aluminum sheet; and
controlling the separation of the non-bonded portions by moving the at least one movable component while the non-bonded portions are separated.

26. A method for forming structural components from raw sheet material, comprising:
preparing the mating surfaces of two pieces of sheet material, said two pieces of sheet material comprising structural grade aluminum;
applying a predetermined pattern of bond inhibiting material to at least one of the mating surfaces;
preheating the two pieces of sheet material at a low temperature to achieve a roll bondable condition while avoiding the formation of oxides or contaminants on the mating surfaces;
roll bonding the two preheated pieces of sheet material to create a roll bonded sheet, wherein the roll bonded sheet is substantially unitary at those locations where no bond inhibiting material was placed and has a double wall structure where the bond inhibiting material was placed;
forming the roll bonded sheet into a finished component;
placing the bonded sheets in a die, the die having at least one movable component which initially secures a portion of the bonded sheets;
separating the non-bonded portions of the first aluminum sheet and the second aluminum sheet to create a gap between the first aluminum sheet and the second aluminum sheet; and
controlling the separation of the non-bonded portions by moving the at least one movable component while the non-bonded portions are separated, wherein controlling separation includes moving the at least one movable component in a direction generally parallel to the bonded sheets while the non-bonded portions are separated.

27. The method of claim 26 including controlling expansion of the non-bonded areas by moving at least one control pad at a non-bonded portion in a direction generally transverse to the bonded sheets.

28. A method for creating a roll bonded blank for use in further manufacturing components, comprising:
preparing the mating surfaces of a first material and a second material, said first and second materials comprising structural grade aluminum;
applying a predetermined pattern of bond inhibiting material to at least one of the mating surfaces;
preheating the first material sheet and the second material sheet at a low temperature to achieve a roll bondable condition while substantially avoiding the formation of oxidation or contaminants on the mating surfaces by quickly preheating at a low temperature and controlling the environment surrounding the sheet pieces while they are preheated; and
roll bonding the two pieces of sheet material to create at least one roll bonded blank, wherein the at least one roll bonded blank is substantially unitary at those locations where no bond inhibiting material was placed and has a double wall structure where the bond inhibiting material was placed, the step of roll bonding the two pieces of sheet metal being performed substantially immediately following the step of preheating in order to substantially limit oxidation on the mating surfaces;
placing the roll bonded blank in a die having at least one movable die component which initially secures a portion of the bonded sheets;
separating the double wall structure to create a gap between first aluminum sheet and the second aluminum sheet; and
controlling the separation of the double wall structure by moving the at least one movable component while the double wall structure is separated, wherein controlling separation includes moving the at least one movable component in a direction generally parallel to the bonded sheets while the double wall structures are separated.

29. The method of claim 28 including controlling expansion of the double wall structures by moving at least one control pad at a double wail structure in a direction generally transverse to the bonded sheets.

30. The method of claim 13 wherein the step of controlling the environment comprises treating the preheating chamber with nitrogen.

31. The method of claim 1, wherein preheating the first and second sheets comprises rapidly preheating the first and second sheets.

* * * * *

UNITED STATES PATENT AND TRADEMARK OFFICE
CERTIFICATE OF CORRECTION

PATENT NO.        : 6,626,351 B2
APPLICATION NO. : 09/849943
DATED              : September 30, 2003
INVENTOR(S)      : Lawrence M. Dziadosz and Clarence W. Fulton It is certified that error appears in the above-identified patent and that said Letters Patent is hereby corrected as shown below:

Column 2:
Line 37, "make" should be --may--

Column 5:
Line 2, "7" should be --8--
Line 2, "lines A-A" should be --line 9-9--

Column 7:
Line 46, "A-A" should be --9-9--

Column 11:
Line 6, Claim 24, "rail" should be --roll--
Line 15, Claim 25, "sheer" should be --sheet--

Column 12:
Line 43, Claim 29, "wail" should be --"wall"

Signed and Sealed this

Twenty-second Day of August, 2006

JON W. DUDAS
*Director of the United States Patent and Trademark Office*